US009164857B2

(12) United States Patent
Houseman et al.

(10) Patent No.: US 9,164,857 B2
(45) Date of Patent: Oct. 20, 2015

(54) SCALABLE STRUCTURED DATA STORE OPERATIONS

(71) Applicant: Hewlett-Packard Development Company, L.P., Houston, TX (US)

(72) Inventors: Matthew P. Houseman, Scotts Valley, CA (US); Jun Li, Mountain View, CA (US); Colin Heng Fai Tsui, Fremont, CA (US); Alvin Cheng-Tser Chen, Fremont, CA (US); Ajay Dhar, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 13/754,241

(22) Filed: Jan. 30, 2013

(65) Prior Publication Data
US 2014/0215279 A1    Jul. 31, 2014

(51) Int. Cl.
*G06F 11/00*    (2006.01)
*G06F 11/22*    (2006.01)

(52) U.S. Cl.
CPC .................................. *G06F 11/2268* (2013.01)

(58) Field of Classification Search
CPC .. G06F 11/22; G06F 11/2205; G06F 11/2268
USPC .......... 714/4.1, 4.2, 4.21, 4.3, 4.4, 20, 40, 41, 714/47.1, 47.2, 47.3
See application file for complete search history.

(56) References Cited

U.S. PATENT DOCUMENTS

| | | | |
|---|---|---|---|
| 7,024,592 B1 * | 4/2006 | Voas et al. ..................... | 714/47.3 |
| 7,228,458 B1 * | 6/2007 | Kesavan .......................... | 714/41 |
| 7,366,740 B2 | 4/2008 | Sleeman et al. | |
| 7,370,101 B1 * | 5/2008 | Lakkapragada et al. ...... | 709/223 |
| 7,467,333 B2 * | 12/2008 | Keeton et al. ................... | 714/41 |
| 7,529,653 B2 * | 5/2009 | Frankel et al. .................. | 703/13 |
| 7,536,605 B2 * | 5/2009 | Keaffaber et al. .............. | 714/41 |
| 7,890,810 B1 * | 2/2011 | Coatney et al. ................. | 714/41 |
| 8,707,104 B1 * | 4/2014 | Jean ................................ | 714/41 |
| 8,738,964 B2 * | 5/2014 | Markus ........................... | 714/20 |
| 2004/0199573 A1 * | 10/2004 | Schwartz et al. ............. | 709/201 |
| 2006/0277444 A1 * | 12/2006 | Holian et al. ................... | 714/41 |
| 2011/0252181 A1 | 10/2011 | Ouye et al. | |
| 2012/0203745 A1 | 8/2012 | Myers et al. | |

OTHER PUBLICATIONS

Tanenbaum, Andrew S.; "Structured Computer Organization (Second Edition)"; Prentice Hall, Inc.; 1984; pp. 10-12.*
Hansen, et al., "Scalable Virtual Machine Storage Using Local Disks", Retrieved from http://www.diku.dk/~jacobg/pubs/osr.pdf, Dec. 2010, 9 pages.
Varga, M., "Challenges of Data Management in Always-on Enterprise Information Systems", Retrieved from http://bib.irb.hr/datoteka/448559.978-1-60566-723-2.ch007.pdf, Jul. 23, 2009, pp. 109-128.

(Continued)

*Primary Examiner* — Joseph Kudirka
(74) *Attorney, Agent, or Firm* — Michael A. Dryja

(57) ABSTRACT

Scalable structured data store operations can include logging a number of detected corrupted records within a scalable structured data store, repairing the number of corrupted records within a number of nodes of the scalable structured data store, and predicting hardware failure based on the logged number of corrupted records.

19 Claims, 5 Drawing Sheets

(56) References Cited

OTHER PUBLICATIONS

Li, et al., "Managing Data Retention Policies at Scale", IEEE Transactions on Network and Service Management, vol. 9, Issue 4, Dec. 4, 2012, pp. 393-406.

Oracle., "Preventing, Detecting, and Repairing Block Corruption: Oracle Database 11g", Retrieved from http://www.oracle.com/technetwork/database/focus-areas/availability/maa-datacorruption-bestpractices-396464.pdf, May 2012, 17 pages.

Oracle., "Oracle Database, High Availability Best Practices, 11g Release 2", Retrieved from http://docs.oracle.com/cd/E11882_01/server.112/e10803.pdf, May 2012, 262 pages.

Unknown., Cassandra Wiki, "Node Tool", Retrieved from http://wiki.apache.org/cassandra/NodeTool, Dec. 2011, 6 pages.

Unknown., Datastax, "OpsCenter—Operational simplicity for big data", Retrieved from http://www.datastax.com/products/opscenter, Aug. 2012, 2 pages.

Unknown., mongoDB, "Journaling", Retrieved from http://docs.mongodb.org/manual/administration/journaling/, Aug. 2012, 5 pages.

Unknown., Wikipedia, "Self-Monitoring, Analysis and Reporting Technology", Retrieved from http://en.wikipedia.org/wiki/S.M.A.R.T., Aug. 2012, 13 pages.

Schroeder, et al., "Disk failures in the real world: What does an MTTF of 1,000,000 hours mean to you?", Proceedings of the 5th USENIX Conference on File and Storage Technologies, Feb. 2007, San Jose, CA, 22 pages.

\* cited by examiner

SCALABLE STRUCTURED DATA STORE OPERATIONS

BACKGROUND

A data store (e.g., scalable structured data store, etc.) can be used to save data records at a number of nodes. The data records can include backup information for an information technology (IT) system. The backup information can be retrieved to restore information of corrupted records within the IT system. Data corruption of the saved data records within the data store can be a challenging problem for an IT manager. Data corruption within the data store can be left un-detected if the data is not used and/or retrieved. If data corruption of the data is left un-detected, there can be errors and failures if it becomes necessary to retrieve the corrupted data.

DETAILED DESCRIPTION

Figure 1:
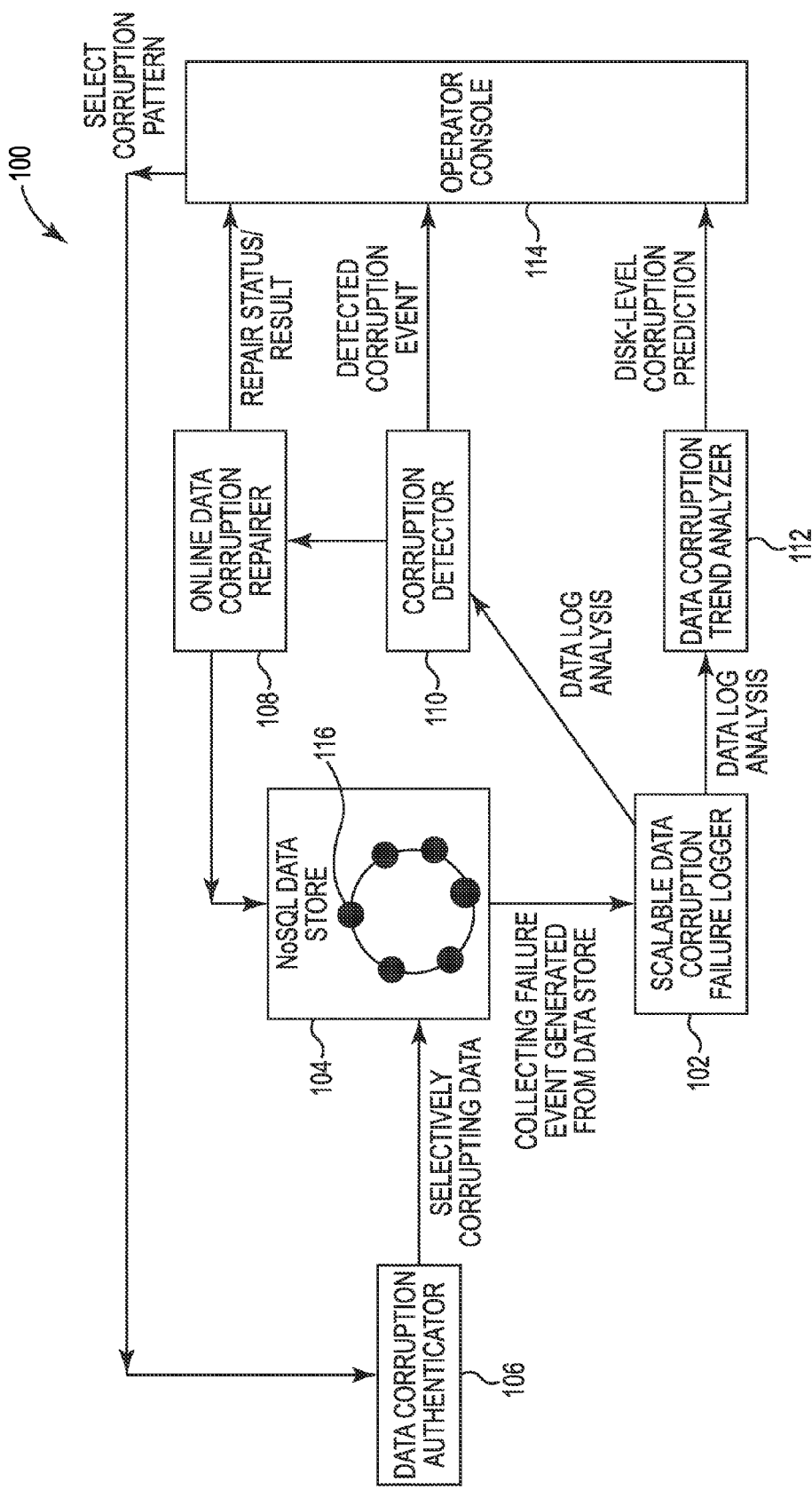
FIG. 1 illustrates a diagram for an example of a scalable structured data store architecture according to the present disclosure.

Scalable structured data store operations can include using a scalable structured data store architecture as described herein. The scalable structured data store (e.g., data store, Not only Structured Query Language (NoSQL) data store, etc.) can include a backup storage system with a number of nodes (e.g., computing devices, memory storage devices, etc.). Copies of the data can be stored within the data store at multiple nodes to ensure that the backup data is not lost. For example, a first copy of the data on a first node can be corrupted and a second copy of the data on a second node can still be available.

The scalable structured data store operations can include a data corruption detector to detect whether data within the scalable structured data store is corrupted. The data corruption detector can be utilized to detect corrupted data within the scalable structured data store prior to the corrupted data being accessed. That is, the corrupted data is detected prior to the data being accessed by an IT system. For example, the IT system can experience a data failure and attempt to access the backup version of the data within the scalable structured data store. In this example, the data corruption detector can detect if the backup version of the data is corrupted prior to the IT system attempting to access the backup version of the data.

The scalable structured data store operations can also include a data corruption authenticator. The data corruption authenticator can purposely corrupt a number of data items within the scalable structured data store to simulate a number of failure conditions within the scalable structured data store. The purposely corrupted data items can be used to test a repair system of the scalable structured data store. That is, the repair system of the scalable structured data store can attempt to repair the purposely corrupted data and the repair system can be monitored to determine if the purposely corrupted data is correctly repaired. The data corruption authenticator can also serve as a functional validation as the NoSQL technology advances and/or evolves. For example, the data corruption authenticator can make sure that the data corruption can be correctly fixed from a first version of the data store software to a second version of the data store software. In this example, the second version of the data store software can be an updated version and/or newer version of the data store software.

The scalable structured data store operations can further include a trend analyzer to monitor a number of nodes within the scalable structured data store and predict signs of hardware failure within the scalable structured data store. For example, the trend analyzer can monitor detected corrupted data and repaired corrupted data within the scalable structured data store. In this example, the trend analyzer can proactively determine if there are any potential hardware storage failures based on trends relating to detecting and/or repairing corrupted data.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

As used herein, "a" or "a number of" something can refer to one or more such things. For example, "a number of articles" can refer to one or more articles.

FIG. 1 illustrates a diagram for an example of a scalable structured data store architecture 100 according to the present disclosure. The scalable structured data store architecture 100 can include a number of features (e.g., corruption logger 102, corruption authenticator 106, data store 104, etc.) for corruption detection, logging, and/or corruption analyzing.

The scalable structured data store architecture 100 can include a data store 104 (e.g., NoSQL data store, etc.). The data store 104 can include a "not only structured query language" (NoSQL) data store. A NoSQL data store can include a data store that is identified by non-adherence to a relational database management system. The NoSQL data store can be optimized for retrieval and appending operations and may not utilize functionality beyond record storage.

The data store 104 can include a number of nodes (e.g., node 116, etc.) that can be memory resources for storing data (e.g., data files, backup files, etc.). Each of the number of nodes can represent a separate and distinct memory resource to store data that can be retrieved by an IT system. For example, the IT system can retrieve a backup file to replace a corrupted file within the IT system, and as a result, the corrupted data records on the corrupted files can be restored. The data store 104 can be used to store data records for extended periods of time (e.g., months, years, etc.) based on the type of data records being stored. For example, backup records relating to pricing information can be stored for a different duration compared to backup records relating to purchase orders.

The scalable structured data store architecture 100 can include a corruption logger 102 (e.g., scalable data corruption logger, etc.). The corruption logger 102 can capture a number of corruption events (e.g., log detected corrupted files, etc.) in real time. The captured corruption events can be utilized as dispatch information (e.g., information sent to instruct repair, etc.). For example, the captured corruption events can be utilized to determine a location of corrupted data (e.g., particular node, particular row, etc.). In this example, the location can be used to locate and repair the corrupted data.

The corruption logger 102 can be used to locally log corruption events on a particular node (e.g., node 116, etc.) within the scalable structured data store 104. The corruption logger 102 can utilize various software (e.g., log 4j, etc.) and/or hardware for logging the corruption events. The corruption logger 102 can be available to continuously log corruption events within the data store 104. The corruption logger 102 can log corruption events for a cluster of nodes (e.g., multiple nodes within a particular machine, multiple nodes within a particular data store, etc.).

The corruption logger 102 can log corruption events at a predefined location (e.g., predefined data store, predefined node within a data store, etc.). The corruption logger 102 can send the logged corruption events to a remote logging application. The corruption logger 102 can determine and label each corruption event with a level (e.g., error, fatal, etc.). For example, the corruption logger 102 can determine that a particular corruption event is an error corruption of a data file. In this example, the corruption logger 102 can label (e.g., tag, etc.) the particular corruption event to identify that the particular corruption event is an error corruption of the data file.

The corruption logger 102 can also include an additional monitor (e.g., Cron Monitor, etc.) to ensure that the corruption logger 102 is continuously logging corruption events. The additional monitor can periodically check a status of the corruption logger 102. A Cron Monitor can be run on a cron table (e.g., crontab, etc.), a configuration file that specifies commands (e.g., tasks to be run, etc.) to run periodically on a given schedule.

The scalable structured data store architecture 100 can include a corruption detector 110. The corruption detector 110 can analyze the captured corruption events logged by the corruption logger 102 to determine if any of the corruption events are related to data corruption, data failure, and/or data error. The corruption detector can analyze the captured corruption events to check for pre-defined error patterns within the logged corruption events. For example, the corruption detector 110 can determine a pattern of corruption events to determine a number of repairs on a particular node. The corruption detector 110 can notify a corruption repairer (e.g., corruption repairer 108, etc.) and send the number of determined repair operations for the determined pattern of corruption events.

The corruption detector 110 can maintain the number of determined repair operations in a database that is separate from the data store 104 (e.g., event status database, etc.). The corruption detector 110 can utilize the separate database to send a repair command to the corruption repairer 108 if the node has not performed a repair for a particular period of time. The corruption detector can eliminate sending multiple repair operations to the corruption repairer by utilizing the separate database and only sending the repair command to the corruption repairer if the node has not performed a repair for the particular period of time (N).

The time parameter can be configurable based on a number of conditions. Node 116 within the data store can have a number of conditions. For example, the conditions can include that if Node 116 is currently undergoing a repair and the run time of a current repair job does not exceed or equal a predetermined repair time value (e.g., Maximum Repair-Time value, etc.), then the events can be logged on the corruption logger 102 and no new repair may be scheduled. If Node 116 is currently undergoing a repair but the run time of current repair job exceeds the predetermined repair time value, an alert can be sent to the operator console and a new repair can be scheduled. In another example, the corruption detector 110 can schedule a repair if there is no repair running on Node 116.

The corruption detector 110 can determine whether to send repair commands to the corruption repairer and/or communicate with an operator console (e.g., operator console 114, etc.). The corruption detector 110 can determine a corruption type. For example, the corruption detector 110 can determine if the data corruption is occurring in a relatively small amount of data records and a repair can be done to relatively small amount of data records. In another example, the corruption detector 110 can determine if the data corruption is occurring in a relatively large number of data records that share the same and/or similar data store image file and a repair command can be sent to repair the majority and/or entire data store image of a particular node and/or machine. A data store image file can store the persistent information regarding the data records that are stored on a corresponding machine where the data store image file is located in its local file system.

The scalable structured data store architecture 100 can also include a corruption repairer 108. The corruption repairer 108 can receive a number of repair commands from the corruption detector 110. The repair commands can include repair information. The repair information can include information such as the corruption pattern, data records, and/or machine nodes that are corrupted and need repair. The repair information can also include schema information such as a data schema and/or data table names of the corrupted data. The corruption repairer 108 can execute a number of repair commands based on the received repair information.

The corruption repairer 108 can generate a corruption repair plan for repairing the number of corrupted files. For example, the corruption repairer 108 can generate the corruption repair plan based on the repair information. The repair information can include the corruption pattern that was detected by the corruption detector 110. The corruption pattern can be used to identify a best corruption repair plan among a number of repair plans. For example, the corruption pattern can identify the corruption type and the repair plan can be based in part on the corruption type.

The corruption repairer 108 can perform a query on the corrupted data records. For example, the corruption repairer 108 can perform a query after repairing the number of corrupted records by sampling some of the repaired number of corrupted records to determine if the number of corrupted records are successfully repaired. The corruption repairer 108 can send a repair status to the operator console 114. The repair status can include a number of successfully repaired corrupted records and/or unsuccessfully repaired corrupted records.

The corruption repairer 108 can be configured to include a computer processing unit (CPU) load threshold. For example, the corruption repairer 108 can be dispatched when the CPU load is less than or equal to a predetermined CPU load threshold. In the same example, the corruption repairer 108 may not be dispatched when the CPU load test is greater than the predetermined CPU load threshold. The CPU load threshold can be configured to be enabled in the event of a predetermined corruption type. For example, the repair plan for a particular corruption type can include repairing an entire node and/or machine within the data store 104. In the same example, the repair plan can require a relatively large amount of CPU load compared to repair plans that include repairing less than the entire node. The corruption repairer 108 can be configured to include a CPU load threshold to prevent an IT system from reaching CPU load max.

The operator console 114 can be used to display the repair status of repairing the number of corrupted files. Displaying the repair status can enable a user (e.g., IT manager, etc.) to confirm the repair status of repairing the number of corrupted records. The operator console 114 can also be used to configure the time parameters, input corruption patterns, configure CPU load threshold, among other parameters.

The scalable structured data store architecture 100 can also include a data corruption trend analyzer 112. The data corruption trend analyzer 112 can aggregate corruption events for each node and/or machine within the data store 104. The data corruption trend analyzer 112 can use the aggregated corruption events to determine if there is a likelihood of hardware failure of one or more of the nodes and/or machines within the data store 104. For example, a probability of hardware failure can be determined based on the aggregated corruption data. In this example, if the probability is greater than a predetermined threshold, it can be determined that there has been a hardware failure of a particular node and/or machine.

The data corruption trend analyzer 112 can alert a user (e.g., IT administrator, system administrator, etc.) of the hardware failure. Alerting a user of a high probability of hardware failure can help in anticipating hardware failures that can cause multiple data failures or full system failures.

The aggregated corruption events that trigger an alert to the user can be configurable utilizing the operator console 114. For example, a user can configure the data corruption trend analyzer 112 based on the type of hardware used. In this example, particular types of hardware can have an increased probability for hardware failures at particular nodes and the aggregated corruption events that trigger an alert can be configured to incorporate increased probability of failure at particular nodes.

The scalable structured data store architecture 100 can also include a data corruption authenticator 106. The data corruption authenticator 106 can implement a corruption and a corruption recovery plan. The data corruption authenticator 106 can purposely corrupt a number of records within the data store 104. The data corruption authenticator 106 can determine a number of records to corrupt $N_{corrupted}$ and create a table of the records to be corrupted. For example, the data corruption authenticator 106 can use a data schema and/or data table to determine the number of records to corrupt. Prior to corruption of the number of records, the corruption repairer 108 can be configured to include a "no deletion of data" rule. That is, no records can be deleted attempting to repair the purposely corrupted data record set. Configuring the corruption repairer 108 to include a "no deletion of data" rule can ensure that no valuable data is lost within the data store 104. The data corruption authenticator 106 will be discussed in further detail with respect to FIG. 3.

The scalable structured data store architecture 100 can ensure that corrupted records within the data store 104 are detected and repaired. The corrupted records can increase cost and time if they are not efficiently detected and repaired. In addition, the scalable structured data store architecture 100 can test corrupted file detection and repair plans by purposely corrupting a number of data records and attempting to detect and repair the purposely corrupted data records.

Figure 2:
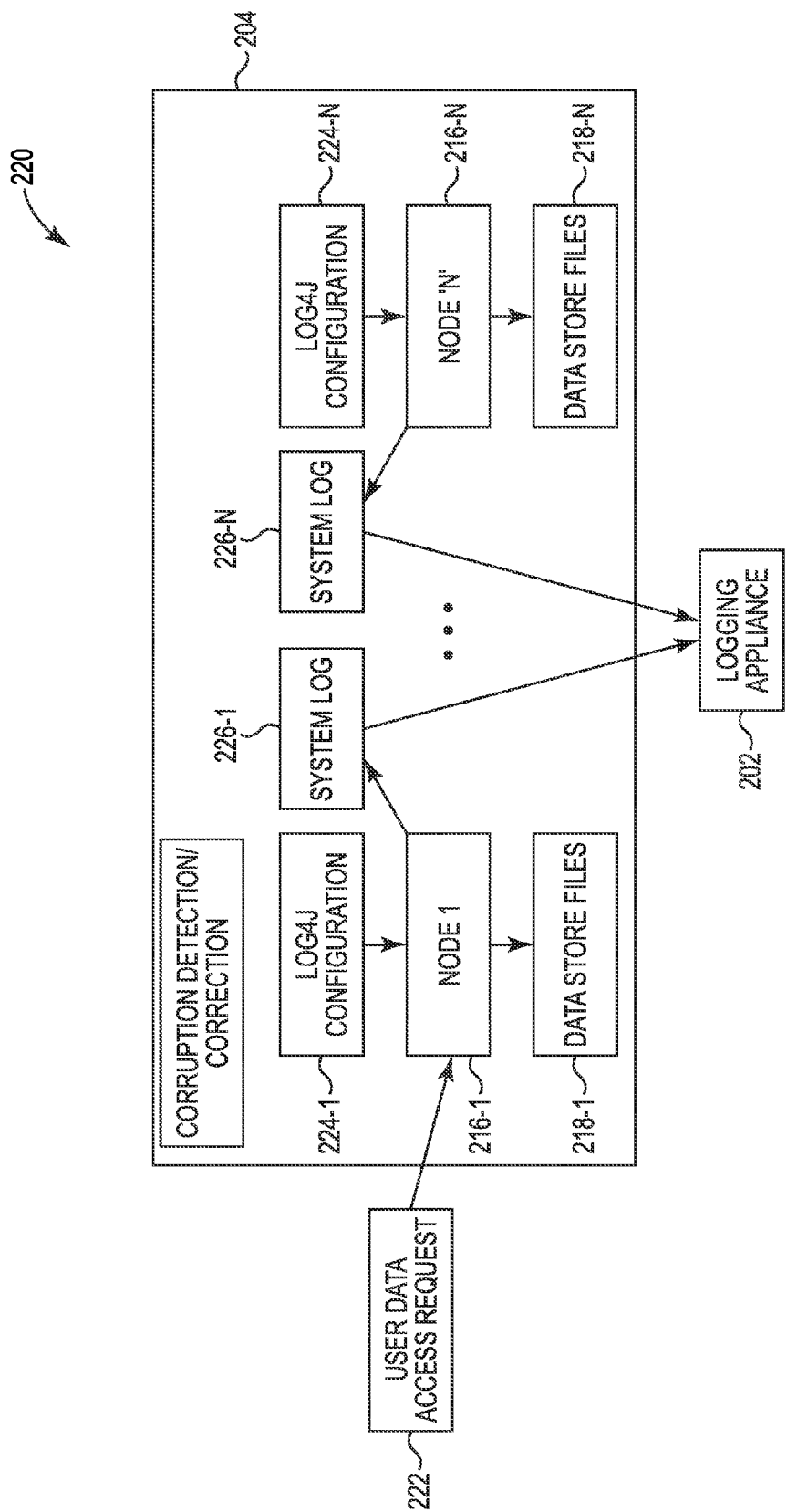
FIG. 2 illustrates a diagram for an example of a scalable data corruption logger architecture according to the present disclosure.

FIG. 2 illustrates a diagram for an example of a scalable data corruption logger architecture 220 according to the present disclosure. The scalable data corruption logger architecture 220 can include a corruption logger 202. The corruption logger 202 can include the same and/or similar functions to the corruption logger described in reference to FIG. 1 (e.g., corruption logger 102, etc.).

The corruption logger 202 can receive and log events from a number of system logs 226-1, 226-N within a data store 204. The number of system logs 226-1, 226-N can collect a number of events from a corresponding node 216-1, 216-N. The number of events collected by the system logs 226-1, 226-N can be based on a predetermined log configuration 224-1, 224-N. The log configuration 224-1, 224-N can be based on the type of hardware and a particular node location. For example, the particular node location can have an increased probability for hardware failure. In this example, the log configuration 224-1, 224-N can log a greater number of events in an attempt to predict a hardware failure prior to a real hardware failure.

The data store 204 can have a number of user data access requests 222. The requests 222 can include a specific data record that is stored on a particular node. For example, a user can request a data record located at Node-1 216-1 and persistently stored within the data store file 218-1. In another example, the user can request a data record located at Node-N 216-N and persistently stored within the data store file 218-N.

The corruption logger 202 can receive and aggregate the number of events from each of the number of system logs 226-1, 226-N. The corruption logger can aggregate the number of events based in part on the type of event and/or the location of the event. For example, the corruption logger 202 can receive a number of events from system log 226-1. The corruption logger 202 can aggregate all events received from the system log 226-1 and categorize the aggregated events into various types of events.

Figure 3:
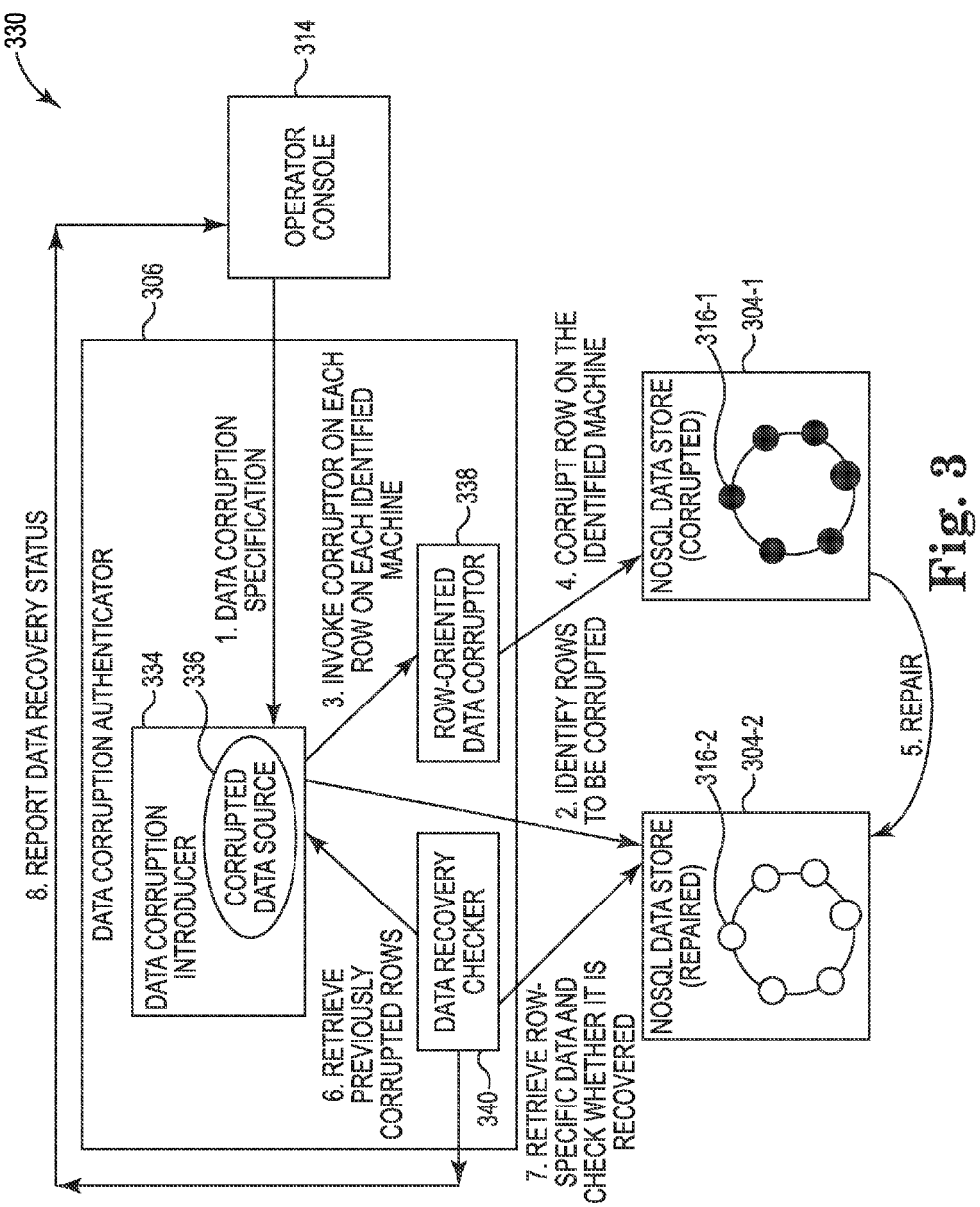
FIG. 3 illustrates a diagram for an example of a scalable data corruption authenticator architecture according to the present disclosure.

FIG. 3 illustrates a diagram for an example of a scalable data corruption authenticator architecture 330 according to the present disclosure. The scalable data corruption authenticator architecture 330 can include a data corruption authenticator 306. As described herein, the data corruption authenticator 306 can purposely corrupt a number of data store image files within a data store. For example, the data corruption authenticator 306 can purposely corrupt a node 316-1 within data store 304-1 to test repair plans.

The data corruption authenticator architecture 330 can be connected to an operator console 314. The operator console 314 can be used to configure the data corruption authenticator architecture 330. For example, the operator console 314 can be used to send a data corruption specification to the data corruption authenticator architecture 330 to corrupt a particular number of data files at a particular number of locations (e.g., nodes, machines, etc.).

The data corruption specification can include the corruption of the entire files stored on the node's file system. These files can persistently store the metadata of the data store, such as the data schema definition, as well as the indexes of the data store table. The data corruption specification can also include a corruption pattern for the purposeful corruption of data records. The corruption pattern can simulate actual corruption patterns from logged corruption events to simulate particular corruption types. For example, logged corruption events can reveal a particular corruption pattern that corresponds to a particular corruption type.

The scalable data corruption authenticator architecture 330 can include a data corruption introducer 334. The data corruption introducer 334 can determine and designate a number of rows (e.g., data records, etc.) within nodes and/or machines to corrupt and a time to execute each corruption. The time to execute each corruption and the corruption type can be used to simulate a real corruption pattern.

The data corruption introducer 334 can examine a data store image file for a particular node and/or machine and retrieve a number of keys on a row of records stored on the particular node and/or machine. The data corruption introducer 334 can select and retrieve a number of keys that can represent a different row of data records stored on a selected node and/or machine. For example, the data corruption introducer 334 can randomly select a number of data records that correspond to a particular set of chosen row of data records to corrupt. Furthermore, the data corruption introducer 334 can select a subset of data content within a chosen data record to be corrupted. The data corruption introducer 334 can determine the subset of the data content by assigning a length for the corruption (e.g., considering the stored data record as a byte array, etc.) and/or corruption can happen within any segment of a byte array. Assigning a length for the corruption can ensure that the corruption is isolated to be within a desired record and/or row.

The data corruption introducer 334 can record the selected number of data records to be corrupted in a corrupted data source 336. A data source can be a particular data table in the data store. The recorded number of data records to be corrupted can be accessed by data corruptor 338 (e.g., row-oriented data corruptor, etc.). The data corruptor 338 can identify the recorded number of data records to be corrupted within the data store 304-1 and corrupt the data records within the data store 304-1. For example, the data corruptor 338 can identify a number of records and/or rows to be corrupted within node 316-1 and turn the number of rows to be "0" from an offset to a specified length based on information recorded within the corrupted data source 336. After the records are selected, the data corruptor 338 can retrieve and/or verify the records to ensure their integrity (e.g., not corrupted, etc.) before launching the data corruption operation.

The purposely corrupted number of data records can be repaired by a corruption repairer. The corruption repairer can utilize a repair plan to repair the purposely corrupted number of data records as described herein. The repair plan can be based on a pattern of corrupting the number of records from the data corruptor 338.

The repaired number of data records can be represented in repaired data store 304-2. Repaired data store 304-2 can include the repaired number of data records on a particular node 316-2. The repaired number of data records can be confirmed by a data recovery checker 340. For example, the data recovery checker 340 can retrieve information within the repaired data records to confirm that the repaired data records were repaired correctly.

The data corruption authenticator 306 can generate a report of a data recovery status. The data recovery status can be sent and/or displayed on the operator console 314. The data recovery status can include the number of data records to be corrupted, the number of repaired data records, the location of the corrupted data records, etc.

In additional examples, the number of data records to be corrupted can span across more than a single row (e.g., two consecutive rows, etc.) stored on a particular disk block. Corrupting data records across more than a single row stored on the particular disk block can possibly introduce a new row key that does not exist within a data store. If a new row key that does not exist is corrupted, the new row key can be marked as "non-repairable" and be deleted from the data store. In these examples, the corrupted data records that do exist within the data store can be repaired and/or recovered as described herein.

In additional examples, the corruption can happen beyond a small number of data records to be across the entire file on the local file system that stores the persistency information of the data records on the data store cluster node. For example, the data store metadata files and/or data store image files are completely corrupted and/or all of the data records associated with the files are therefore corrupted. The metadata files can be detected and be repaired similarly as described herein. Similarly, the data store image file can be repaired instead of or in addition to repairing individual data records.

In additional examples, the node 316-1 can be brought into an offline isolated environment, as if the node 316-1 has experienced a crash and/or failure. When the node 316-1 is in the isolated environment a full data corruption checking can be performed on the data store image file, data store metadata files, and/or individual data records stored on the node 316-1. After performing the full data corruption checking, the node 316-1 can be brought back online to join the remaining nodes within the data store 304-1. By bringing each node within a data store into an isolated environment, a performance degradation on the system can be mitigated compared to leaving each node online.

Figure 4:
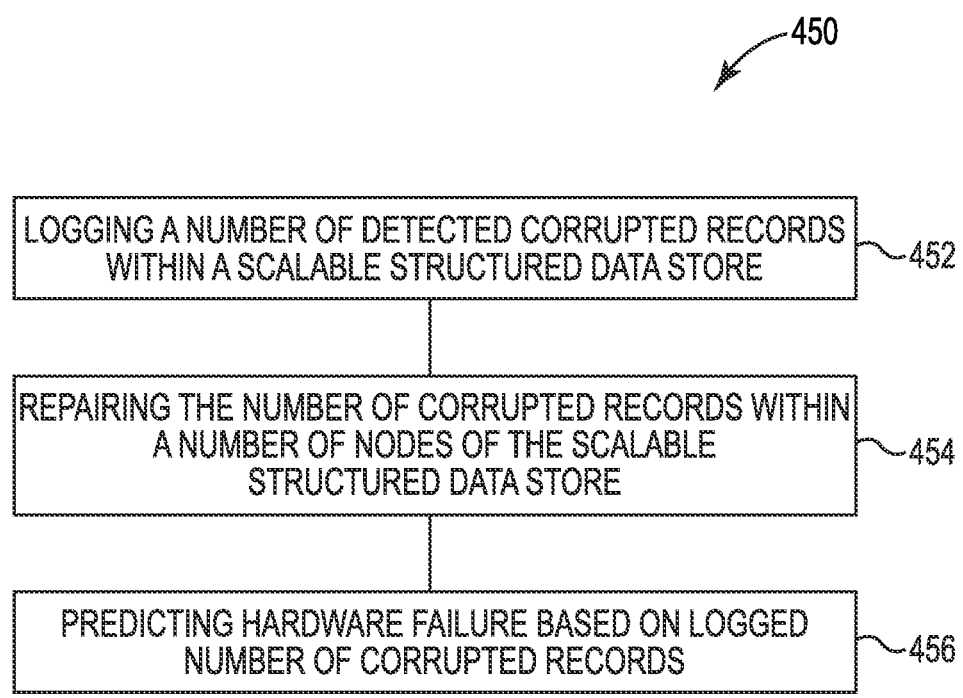
FIG. 4 illustrates a flow chart of a method for an example of scalable structured data store operations according to the present disclosure.

FIG. 4 illustrates a flow chart of a method 450 for an example of scalable structured data store operations according to the present disclosure. The method 450 can include utilizing hardware, software, and/or logic to perform the number of functions. The method hardware, software, and/or logic is further described in reference to FIGS. 1, 2, and 3.

At box 452 method 450 can include logging a number of detected corrupted records within a scalable structured data store. A number of data records can be detected using a corruption detector (e.g., corruption detector 110, etc.). Each of the number of detected corrupted records can be logged by a corruption logger (e.g., corruption failure logger 102, etc.).

The logged events can be analyzed by a data corruption analyzer (e.g., data corruption analyzer 112, etc.) to determine a corruption pattern. The corruption pattern can be used to determine a corruption type. The corruption pattern can be determined by comparing the detected corrupted records to a pre-defined error pattern. As described herein, the corruption pattern and/or the corruption type can be used to develop a repair plan.

At box 454 method 450 can include repairing the number of corrupted records within a number of nodes of the scalable structured data store. Repairing the number of corrupted records can include using the repair plan to repair the number of corrupted records. Repairing the number of corrupted records can also include using the repair plan and/or determined corruption type to repair a data store image file (e.g., descriptive file of a node and/or data store, etc.) instead of repairing individual corrupted records. Native recovery tools of the data store can be used to repair the number of corrupted records and/or the entire corrupted data store image files.

At box 456 method 450 can include predicting hardware failure based on the logged number of corrupted records. Predicting hardware failure can be based on a number of times a record becomes corrupted at a particular location (e.g., particular machine within a cluster, etc.). The number of times a record becomes corrupted can be used to determine a failure trend for each of the number of nodes within the data store. For example, there can be a predetermined frequency threshold of corruptions at a particular location and/or machine. If the logged number of corruptions exceeds the predetermined frequency threshold then a determination can be made that the hardware storing the particular location and/or machine is at a risk for hardware failure.

A determination that hardware at the particular location is at risk for hardware failure can indicate to a user (e.g., system administrator, etc.) that the hardware should be replaced in order to prevent a total failure of the hardware.

Figure 5:
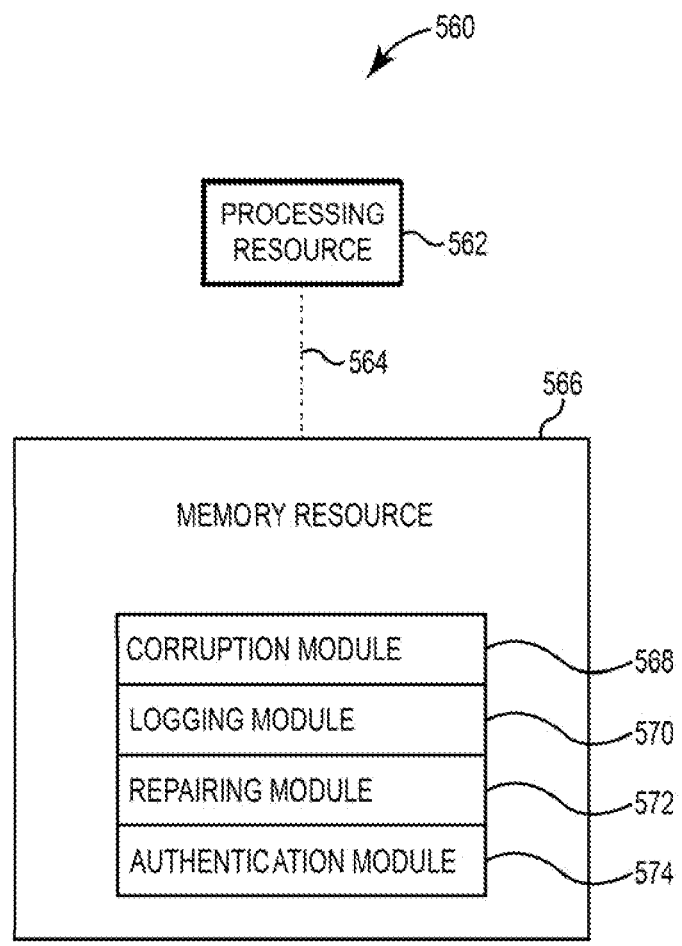
FIG. 5 illustrates a diagram of an example of a computing device according to the present disclosure.

FIG. 5 illustrates a diagram of an example computing device 560 according to the present disclosure. The computing device 560 can utilize software, hardware, firmware, and/or logic to perform a number of functions.

The computing device 560 can be any combination of hardware and program instructions configured to run an agent to execute an automation task in a cloud system. The hardware, for example can include a processing resource 562 and a memory resource 566 (e.g., computer-readable medium (CRM), machine readable medium (MRM), database, etc.) A processing resource 562, as used herein, can include any number of processors capable of executing instructions stored by a memory resource 566. Processing resource 562 may be integrated in a single device or distributed across devices. The program instructions (e.g., computer-readable instructions (CRI)) can include instructions stored on the memory resource 566 and executable by the processing resource 562 to implement a desired function (e.g., identify a scheduled run of an automation task associated with an agent, etc.).

The memory resource 566 can be in communication with a processing resource 562. A memory resource 566, as used herein, can include any number of memory components capable of storing instructions that can be executed by processing resource 562. Memory resource 566 may be integrated in a single device or distributed across devices. Further, memory resource 566 may be fully or partially integrated in the same device as processing resource 562 or it may be separate but accessible to that device and processing resource 562. Thus, it is noted that the system 560 may be implemented on a user and/or a client device, on a server device and/or a collection of server devices, and/or on a combination of the user device and the server device and/or devices.

The processing resource 562 can be in communication with a memory resource 566 storing a set of CRI executable by the processing resource 562, as described herein. The CRI can also be stored in remote memory managed by a server and represent an installation package that can be downloaded, installed, and executed. The system 560 can include memory resource 566, and the processing resource 562 can be coupled to the memory resource 566.

Processing resource 562 can execute CRI that can be stored on an internal or external memory resource 566. The processing resource 562 can execute CRI to perform various functions, including the functions described herein. For example, the processing resource 562 can execute CRI to create a log of a number of detected corrupted records.

The CRI can include a number of modules 568, 570, 572, 574. The number of modules 568, 570, 572, 574, can include CRI that when executed by the processing resource 562 can perform a number of functions.

The number of modules 568, 570, 572, 574 can be sub-modules of other modules. For example, the repairing module 572 and the logging module 570 can be sub-modules and/or contained within the same computing device. In another example, the number of modules 568, 570, 572, 574 can comprise individual modules at separate and distinct locations (e.g., computer-readable medium, etc.).

In some examples, the system 560 can include a corruption module 568. The corruption module 568 can include CRI that when executed by the processing resource 562 can provide a number of corrupting functions. The corruption module 568 can identify a number of data records to be corrupted within a data store (e.g., data store referenced in FIG. 3 at 304-1, etc.) and corrupt the data records within the data store. For example, the data corruption module 568 can identify a number of data records and/or rows to be corrupted within a node and change the number of rows to a value of "0" from an offset to a specified length based on information recorded within a corrupted data record.

In some examples, the system 560 can include a logging module 570 that can include CRI that when executed by the processing resource 562 can perform a number of logging functions. The logging module 570 can receive and aggregate a number of corruption events from various system logs within a data store. In various examples, the logging module 570 can include instructions to categorize the number of corruption events.

In some examples, the system 560 can include a repairing module 572 that can include CRI that when executed by the processing resources 562 can perform a number of repairing functions. The repairing module 572 can include instructions to repair the purposely corrupted data records. In various examples, the repairing module 572 can include native repairing instructions from the data store.

In some examples, the system 560 can include an authentication module 572 that can include instructions to authenticate a number of data records within a data store. The authentication module 574 can determine a number of data records to corrupt and confirm that the number of data records have been correctly repaired by the repairing module 572. In some examples, the authentication module 572 can determine a particular corruption pattern to purposely corrupt a number of data records. In this example, the particular corruption pattern can simulate a real corruption pattern that corresponds to a corruption type.

A memory resource 566, as used herein, can include volatile and/or non-volatile memory. Volatile memory can include memory that depends upon power to store information, such as various types of dynamic random access memory (DRAM), among others. Non-volatile memory can include memory that does not depend upon power to store information.

The memory resource 566 can be integral, or communicatively coupled, to a computing device, in a wired and/or a wireless manner. For example, the memory resource 566 can be an internal memory, a portable memory, a portable disk, or a memory associated with another computing resource (e.g., enabling CRIs to be transferred and/or executed across a network such as the Internet).

The memory resource 566 can be in communication with the processing resource 562 via a communication path 564. The communication path 564 can be local or remote to a machine (e.g., a computing device) associated with the processing resource 562. Examples of a local communication path 564 can include an electronic bus internal to a machine (e.g., a computing device) where the memory resource 566 is one of volatile, non-volatile, fixed, and/or removable storage medium in communication with the processing resource 562 via the electronic bus.

The communication path 564 can be such that the memory resource 566 is remote from the processing resource (e.g., 562), such as in a network connection between the memory resource 566 and the processing resource (e.g., 562). That is, the communication path 564 can be a network connection. Examples of such a network connection can include a local area network (LAN), wide area network (WAN), personal area network (PAN), and the Internet, among others. In such examples, the memory resource 566 can be associated with a first computing device and the processing resource 562 can be associated with a second computing device (e.g., a Java® server). For example, a processing resource 562 can be in communication with a memory resource 566, wherein the memory resource 566 includes a set of instructions and wherein the processing resource 562 is designed to carry out the set of instructions.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A method for scalable structured data store operations, comprising:
   logging a number of detected corrupted records within a scalable structured data store of a number of device nodes that store the records within data store image files of local file systems of the device nodes;
   determining a pattern of corruption events from the log of the number of detected corrupted records, including the number of the device nodes that share a same data store image file storing the corrupted records;
   generating a corruption repair plan based on the pattern of corruption events, including a repair command;
   repairing the number of corrupted records within a number of nodes of the scalable structured data store by sending the repair command to the number of the device nodes that share the same data store image file storing the corrupted records; and
   predicting hardware failure based on the logged number of corrupted records.

2. The method of claim 1, comprising comparing the detected corrupted records to a pre-defined error pattern.

3. The method of claim 1, comprising generating a corruption repair plan for repairing the number of corrupted records.

4. The method of claim 3, wherein the corruption repair plan includes a plan that utilizes native recovery tools of the scalable structured data store.

5. The method of claim 1, comprising creating a corrupted record status report.

6. The method of claim 1, wherein predicting hardware failure includes estimating a failure trend for the number of nodes.

7. A non-transitory computer-readable medium storing a set of instructions executable by a processor to cause a computer to:
   corrupt a number of records within a scalable structured data store of a number of device nodes that store the records within data store image files of local file systems of the device nodes;
   detect the number of corrupted records and create a log of the number of detected corrupted records;
   determine a pattern of corruption events from the log of the number of detected corrupted records, including the number of the device nodes that share a same data store image file storing the corrupted records;
   generate a corruption repair plan based on the pattern of corruption events, including a repair command; and
   repair the number of corrupted records according to the corruption repair plan by sending the repair command to the number of the device nodes that share the same data store image file storing the corrupted records.

8. The medium of claim 7, wherein the instructions to corrupt the number of records include instructions to corrupt based on a pre-determined record corruption pattern, the pre-determined record corruption pattern corresponding to the pattern of corruption events.

9. The medium of claim 7, wherein the instructions to create the log of the number of detected corrupted records include instructions to designate an event level for each detected corrupted record.

10. The medium of claim 7, comprising instructions to monitor the logging of the number of detected corrupted records.

11. The medium of claim 7, wherein the instructions to log the number of detected corrupted records include instructions to generate a record corruption pattern.

12. The medium of claim 7, wherein the scalable structured data store is a Not only Structured Query Language (NoSQL) data store.

13. The medium of claim 7, wherein the device nodes are identified by non-adherence to a relational database management system.

14. The medium of claim 7, wherein the set of instructions are executable by the processor to cause the computer to further:
   perform a query after the repair has been performed by sampling a number of the corrupted records to determine whether the number of corrupted records have been successfully repaired.

15. The medium of claim 7, wherein each device node comprises a computing device.

16. A system for scalable structured data store operations, the system comprising a processing resource in communication with a non-transitory computer readable medium, wherein the non-transitory computer readable medium includes a set of instructions and wherein the processing resource is designed to carry out the set of instructions to:
   determine a number of records to corrupt within a scalable structured data store of a number of device nodes that store the records within data store image files of local file systems of the device nodes, and corrupt the number of records;
   create a log of a number of detected corrupted records;
   determine a pattern of corruption events from the log of the number of detected corrupted records, including the number of the device nodes that share a same data store image file storing the corrupted records;
   generate a corruption repair plan based on the log of the number of detected corrupted records, including a repair command, and repair the number of detected corrupted records by sending the repair command to the number of the device nodes that share the same data store image file storing the corrupted records; and
   authenticate the repaired records to determine if the number of corrupted records have been repaired.

17. The computing system of claim 16, wherein to determine the number of records to corrupt includes to utilize a pre-defined record corruption pattern.

18. The computing system of claim 16, comprising instructions to isolate a cluster within the scalable structured data store into an offline isolated environment.

19. The computing system of claim 18, wherein the cluster appears as a crashed node.

\* \* \* \* \*